United States Patent
Kalama

(10) Patent No.: US 10,027,884 B2
(45) Date of Patent: Jul. 17, 2018

(54) METHOD FOR CAPTURING PHOTOGRAPHS AND VIDEOS ON A HANDHELD CLIENT DEVICE WITHOUT CONTINUALLY OBSERVING THE DEVICE'S SCREEN

(71) Applicant: DISNEY ENTERPRISES, INC., Burbank, CA (US)

(72) Inventor: Asa Kalama, Glendale, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/198,235

(22) Filed: Mar. 5, 2014

(65) Prior Publication Data

US 2015/0256740 A1    Sep. 10, 2015

(51) Int. Cl.
*H04N 5/222* (2006.01)
*H04N 5/232* (2006.01)

(52) U.S. Cl.
CPC ..... *H04N 5/23222* (2013.01); *H04N 5/23293* (2013.01)

(58) Field of Classification Search
CPC .............. H04N 5/23222; H04N 5/23293
USPC ........................... 348/333.02, 333.04
See application file for complete search history.

(56) References Cited

U.S. PATENT DOCUMENTS

| | | | | |
|---|---|---|---|---|
| 6,359,650 B1* | 3/2002 | Murakami | | 348/333.04 |
| 2008/0204566 A1* | 8/2008 | Yamazaki et al. | | 348/208.99 |
| 2008/0239104 A1* | 10/2008 | Koh | | G06K 9/00221 348/240.99 |
| 2012/0098992 A1* | 4/2012 | Hosoe | | 348/222.1 |
| 2012/0099000 A1* | 4/2012 | Kim | | H04N 1/3871 348/231.99 |
| 2012/0218456 A1* | 8/2012 | Sweet, III | | H04N 5/23212 348/345 |
| 2013/0201344 A1* | 8/2013 | Sweet et al. | | 348/169 |
| 2013/0293579 A1* | 11/2013 | Wu | | H01L 51/006 345/633 |
| 2014/0126829 A1* | 5/2014 | Seeley | | G06K 9/00671 382/218 |
| 2014/0300722 A1* | 10/2014 | Garcia | | G06T 7/602 348/77 |
| 2014/0300779 A1* | 10/2014 | Yeo | | H04N 5/2351 348/234 |
| 2014/0362255 A1* | 12/2014 | Kuang | | 348/231.5 |

(Continued)

*Primary Examiner* — Sinh Tran
*Assistant Examiner* — Zhenzhen Wu
(74) *Attorney, Agent, or Firm* — Marsh Fischmann & Breyfogle LLP; Kent A. Lembke

(57) ABSTRACT

A client device for image capture in an eyes-free manner or without ongoing observance of the device's display screen to ensure proper framing and focusing. The client device may take the form of a smartphone, tablet, or the like. The client device includes an image capture application run by a processor to select a target to be included in a digital image captured by the client device's camera. The image capture application causes the processor to operate feedback mechanisms to prompt an operator of the client device to move the device so as to move the camera or its lens, before or during the capturing of the digital image, from a first orientation to a second orientation relative to the target. The image capture application urges the operator of the client device to hold their client device so as to better frame or focus on the selected target.

16 Claims, 4 Drawing Sheets

(56) References Cited

U.S. PATENT DOCUMENTS

2014/0368716 A1* 12/2014 Maruyama et al. ..... 348/333.01
2015/0016733 A1* 1/2015 Park et al. .................... 382/218

* cited by examiner

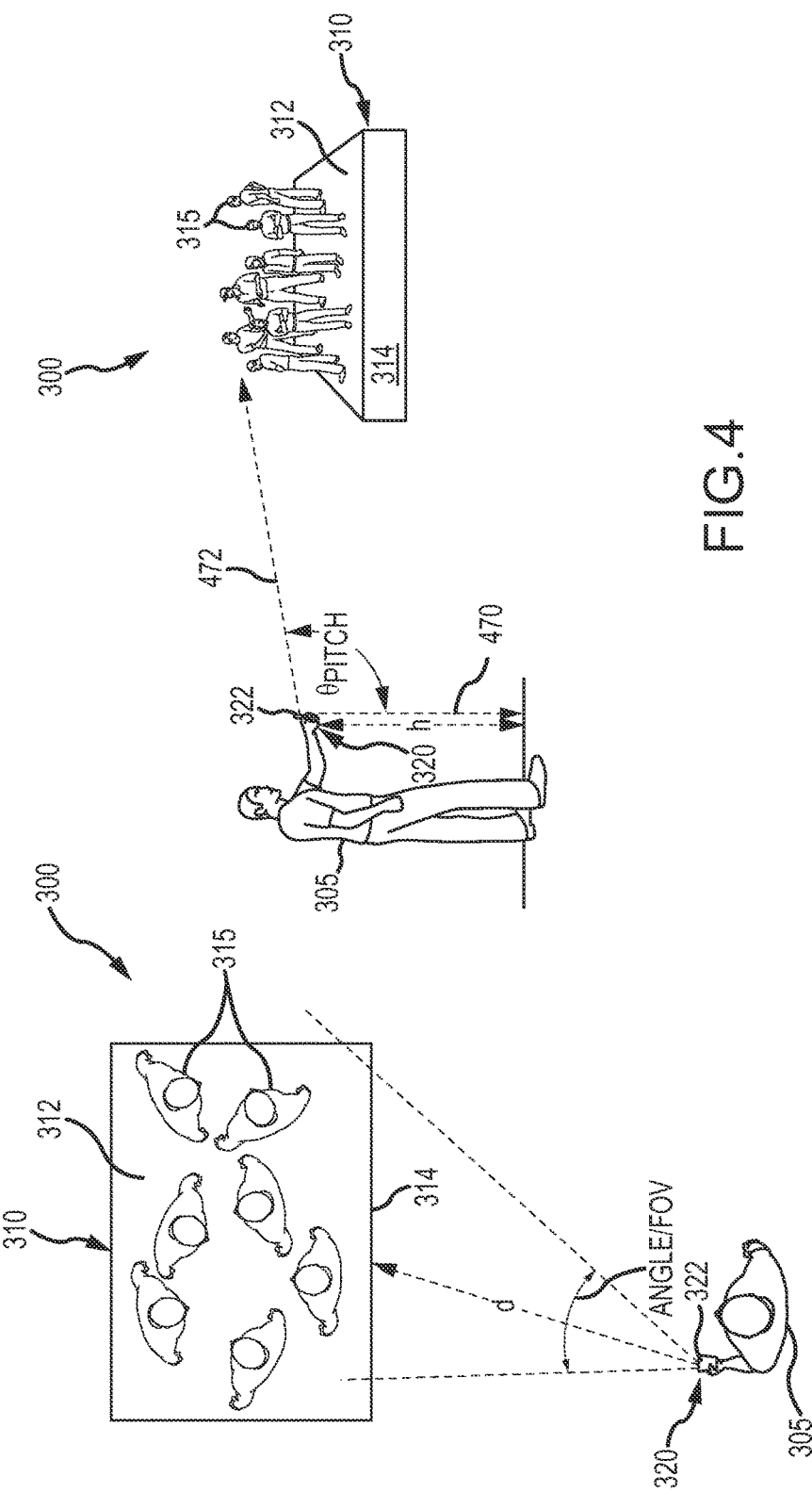

METHOD FOR CAPTURING PHOTOGRAPHS AND VIDEOS ON A HANDHELD CLIENT DEVICE WITHOUT CONTINUALLY OBSERVING THE DEVICE'S SCREEN

BACKGROUND

1. Field of the Description

The present invention relates, in general, to digital cameras and other portable devices configured for capturing digital photographs and videos such as smartphones, tablets, handheld video games, and the like, and more particularly, to a method and corresponding apparatus for allowing an operator of a digital device to capture a desired shot, image, video, or the like of an event without having to look at a display screen or touchscreen of their portable digital device.

2. Relevant Background.

Today, with advances in technologies and the lowering of prices, nearly everyone uses or at least has access to digital devices that are adapted to perform numerous tasks. For example, many digital devices are designed to perform one main task such as to act as a cellular telephone, to allow an operator to read books and other publications that are in digital form (e.g., electronic books or ebooks), to access the Internet to allow the user to download and watch videos or play games and access numerous websites, and the like. Further, though, it has been common for the digital device, such as a smartphone, tablet, or the like, to also be configured to digitally capture still photographs and/or videos ("digital images") or, in other cases, the user may use a handheld device specifically designed to be a digital camera to take such digital images. This collection of digital devices may be collectively thought of as or labeled "handheld client devices" or, more simply, "client devices."

Each of the handheld client devices typically will in fact be a small computer or computing device with one or more processors managing memory (e.g., to store the digital images) and running an operating system (OS) and a software suite. The software suite includes applications such as a browser (e.g., a full HTML web browser) to access the Internet and its voluminous data, but many other applications or "apps" (or "mobile apps") may be included to perform other tasks such as to provide maps with many mobile digital devices including a GPS navigation unit, to play media such as music and movies, to access email, and so on. The handheld client devices typically will include one or more screens, which may also be touchscreens, to display data and images and to allow the operator of the devices to interact with their devices including initiating and using all of their apps. Commonly used handheld client devices include smartphones, digital cameras, and a wide variety of portable or mobile computers adapted for wireless communications (access to the Internet via WiFi networks) such as tablets, laptops, pads, handheld game consoles and the like.

Handheld client devices have become immensely popular with nearly everyone carrying at least one with them at all times. These devices are useful for making life more enjoyable and for reducing stress such as by making communications easy and allowing the user to efficiently find their way around a new location or city. However, client devices as presently designed often also detract from the user enjoying the present moment or experience. For example, an observer of a crowd at any live event, such as a concert, a parade, a sporting event, a fireworks or light show, a play, a wedding, and so on, will look into a sea of cellphone and tablet screens. This is because a large percentage of the audience is not personally or directly watching and enjoying the live event but, instead, are operating their device to film or capture a still photograph or video of the event to share with others (e.g., quickly post in an online social media service) or to remember the event. The members of the audience want to capture the special moment, but one downside is that much of the audience does not capture it with their own eyes but mediated by or through the screen of their client device.

Hence, there remains a need for methods and systems to assist operators of digital devices or handheld client devices such as smartphones and mobile computers to better capture a photograph and a video (i.e., a digital image(s)). Preferably, the methods and systems would be adapted to allow the user to confidently capture the "perfect shot" of a live event they are attending or participating in without actually needing to look (or continually look) through the screen of their device (e.g., in an "eyes-free manner").

SUMMARY

Briefly, a solution is described herein to allow an operator of a handheld client device to effectively capture digital images such as a video of a targeted item (e.g., a portion of a live event). The solution is configured to capture the digital images, from a desired angle in many cases, without requiring the user to use their screen to manually focus and aim their device's camera lens at the targeted item, e.g., without having to continually look through the device's screen during all or most of a captured video.

One embodiment includes a client device with a digital image capture module (e.g., a mobile application or app), which may be an OS-appropriate, native application downloaded onto or installed on the client device. The digital image capture module or image capture app is configured to use the client device's embedded sensors to enable eyes-free photo and video capture. For example, an event venue may be used to provide a live event or show such as an amusement or theme park providing a parade along a predefined parade route, a light or firework show over a lagoon, or a concert in a particular show arena. In such settings, the show or live event takes place at a known location in three dimensional (3D) space, and this event/show location may be stored in the device's memory (or retrieved in real time) for later use in image capture operations.

In response to a user/operator initiating an image capture sequence/process, the digital image capture module may access a collection or set of device sensor data to better capture a digital image such as by using the client device's embedded global positioning system (GPS) sensor to establish location, using the device's compass to establish azimuth, and using the device's accelerometer to establish pitch. The module processes this data in combination with the known location of the show/live event (which may be retrieved by the module via wireless accessing of a communications network such as the Internet or may be stored in the device's memory when the module/mobile app is downloaded or at a later time) to determine when the device's camera (or the camera's lens) is properly oriented towards the show or live event (e.g., determine when the camera's lens is effectively targeting the action).

Other features of the client device may be operated by the image capture module (or via communications with the OS running such devices) to provide the user feedback to direct them how to best position or orient their device and its camera lens to best capture the desired digital image. For example, the device's rumble feature or vibrate elements may be used to provide feedback to indicate to the user holding the device how they need to adjust the orientation of the device to continue to frame the action/live event. In practice or operation of the image capture module, the user may simply hold up their device in a quasi-arbitrary manner to generally aim or focus on the desired target (e.g., generally aim their device's camera lens at a parade, a band playing a concert, a light show in the sky, and so on), enjoy the live event with their own eyes (without staring at the device's small screen), and still capture the digital image recording the moment for posterity (e.g., with eyes-free movement of the device in response to feedback from the device's rumble/vibrate or other components (such as an audio feedback mechanism providing noises or spoken instructions regarding proper orientation)).

When launched, the image capture module or app may be adapted to prompt the user by generating an image and/or text on the device's screen to select a still image or video image mode. Next, the image capture module or app may update the screen display to ask the user to select a show or event (or even a physical structure) they would like to capture or record. In some cases, a menu that is context sensitive may be displayed based on the present geographical location of the client device. In other cases, the "selection" of the show or event will be automated by the image capture module or app such as based upon the device's present location and the time of day (e.g., only one event or show is scheduled for a venue or near a physical location at that time of day such that the module or app can determine which show is to be recorded with a still or video image). Once an event or show or other targeted item is selected, the image capture module or app may function to prompt the user to orient their device (and its camera lens) toward the targeted item (e.g., at a show start time or at a start time entered by the user) and to operate the device's camera to capture the still or video image (at a show or event predefined length or by a record duration time entered by the user). The user can enjoy the event or show without distractions associated with glancing back and forth at the device's screen.

More particularly, a client device is provided that is specially adapted for enhanced image capture such as in an eyes-free manner. The client device, which may take the form of a smartphone, tablet, or the like, includes a processor, memory accessible by the processor, a camera with a lens, and a body containing the processor, the memory, and the camera. In practice, the camera operates to capture or record a digital image via the lens and to store the captured digital image in the memory. Significantly, the client device also includes an image capture application run by the processor to select a target item to be included in the captured digital image.

During use of the client device (e.g., during an image capture process), the image capture application causes the processor to operate one or more feedback mechanisms to prompt an operator of the client device to move the body so as to move the lens of the camera, before or during the capturing of the digital image, from a first orientation to a second orientation relative to the target item. In this manner, the image capture application assists or urges the operator of the client device to hold their client device so as to better target and/or focus on the selected target item such as a stage on which a live show is occurring, a street upon which a parade is passing, a section of the sky in which a fireworks, water, or light show is presented, a field on which a sporting event is being played, and so on.

In some implementations of the client device, the image capture application determines the first orientation and the second orientation using orientation sensing components in the client device (e.g., a compass, an accelerometer, and the like). For example, the first orientation may be defined by a first pitch and a first azimuth and the second orientation may be defined by a second pitch and a second azimuth. In such cases, the image capture application further can act to determine a present location of the client device, and the second orientation is selected by the image capture application so as to be within a range of acceptable orientations for capturing an image of the target item from the present location.

In some implementations, the image capture application further acts to determine a present location of the client device, to determine a first height of the lens of the camera, to compare the first height of the camera to an acceptable range of heights for capturing an image of the target item at the present location of the client device, and when the first height is outside of the acceptable range of heights to operate the one or more feedback mechanisms to prompt the operator to move the camera from the first height to a second height within the acceptable range of heights. In the same or other cases, the image capture application further acts to determine a present location of the client device. Then, the second orientation is selected to provide the camera with a field of view of the target item from the present location.

The feedback mechanisms may include a vibration mechanism selectively operable until the lens of the camera is in the second orientation (e.g., rumble the body when out of proper focus to encourage the operator to move the client device). In some cases, though, the feedback mechanisms include a display screen on a face of the body, and the display screen is operated to change from a first color to a second color when the lens of the camera is in the second orientation. In other situations, the feedback mechanisms include a mechanism adapted to move the body of the client device within a hand of the operator to automatically move the lens of the camera from the first orientation to the second orientation.

It may be useful in some client devices for the target item to be selected by the image capture application based on a determination of a present location of the client device. In other cases, though, the image capture application acts to determine a present location of the client device, to lookup a set of potential targets local to the present location, and to display the set of potential targets on a display screen of the client device to prompt the operator to indicate the target item from the set of potential targets.

In some cases, the client device is adapted such that the image capture application responds to user input to augment the captured digital image using augmentation layers. These layers/image files may be selected or modified based on at least one of an orientation of the lens of the camera relative to the target item, a distance between the lens of the camera to the target item, and a height of the lens of the camera during the capturing of the digital image. In this way, the information collected as part of assisting the user in using their device to capture images in an eyes-free manner are later used to select and/or edit/modify augmentation images so that these augmentation layers/images appear to have been collected or captured from the digital camera at the same location, height, distance, and/or orientation as the originally captured image.

BRIEF DESCRIPTION OF THE DRAWINGS

FIGS. 3-6 illustrate a client device that is configured according to the present description with image capture software (or a mobile app) and that is being used by an operator or user to capture or record a digital image of a user-selected target (or targeted item) in a guided but eyes-free manner.

DETAILED DESCRIPTION

Figure 1:
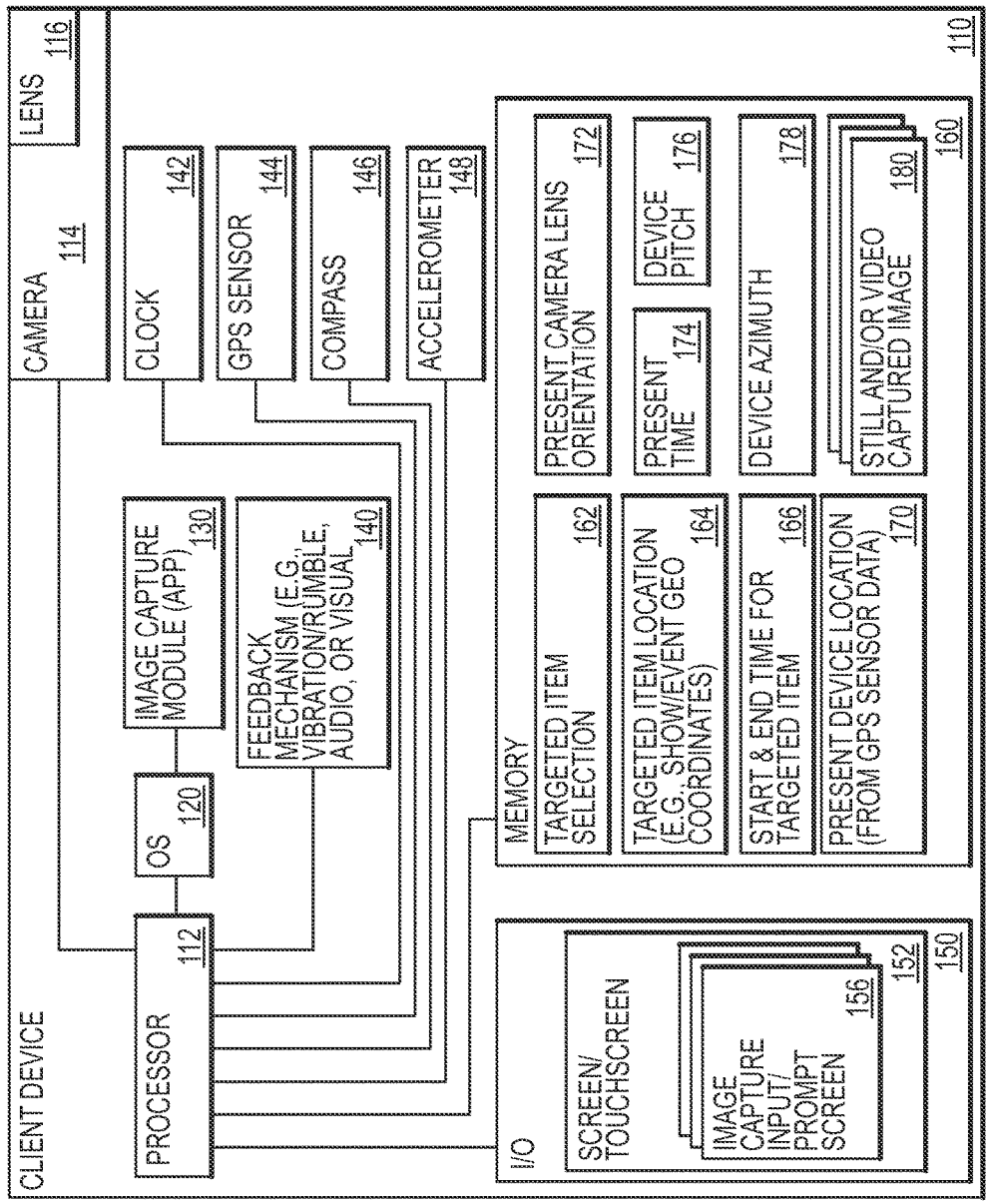
FIG. 1 is a functional block diagram of a client device, such as a smartphone or tablet, configured according to one embodiment for eyes-free image capture.

FIG. 1 illustrates a client device 110, with a functional block or schematic diagram, that is adapted specially to allow its user to capture an image (i.e., digital still or video image 180 in device memory 160) in an eyes-free manner or without continually looking at the device screen 152 rather than watching the live event (or "targeted item" for a photo or video). The device 110 may take a wide variety of forms but typically will be a portable or handheld electronic or computer device that is configured for taking still and/or video images, and the user of the device 110 typically will carry it with them to a location such as a show venue, a sports stadium, an amusement park, or the like where live entertainment or other targeted items for image capture are present. For example, the client device may take the form of a cellular phone (e.g., a smartphone), a mobile computer such as a tablet, pad, laptop, handheld, or the like, a videogame handheld device, a digital reader, a digital camera, or other electronic/computing device.

The client device 110 includes a processor(s) 112 that runs and/or uses an operating system (OS) 120 to run or execute a software suite or number of applications (e.g., mobile apps performing one or more functions). Particularly, the device 110 includes code in the form of an image capture module or app 130 that is appropriate for the OS 120, and the image capture module 130 causes the device 110 to perform the functions described herein to capture one or more still or video images 180 in the device's memory 160 managed by the processor 112. To this end, the device 110 also includes a digital camera 114 that is selectively operable by the image capture module 130 via the processor 112 (and a camera driver/operation software, not shown but understood by those skilled in the art) to focus upon and capture/record digital images 180 of elements viewable through the camera lens (or lenses such as forward looking lenses and rearward lenses) 116. Briefly, the module 130 acts to assist an operator or user of the client device 110 to orient the device such that its camera 114 or, more specifically, the camera lens 116 is oriented properly to be directed toward a targeted item such as a stage of a live show, upward into the sky at a desired angle of a light or fireworks display, or toward a parade passing along a predefined parade route.

The client device 110 includes input/output (I/O) components 150 that may include a display screen (e.g., a touchscreen or a screen along with a keyboard and/or buttons for inputting user selections) 152. During use of the device 110, the image capture module or app 130 may operate to generate and display image capture input/prompt screen 156 that is displayed on the device screen 152. For example, the user may initiate the app 130 via the screen 152, and, in response, the app 130 may generate an input screen 156 requesting the user to select an item to be filmed in an image capture process (as shown at 162 in the memory 160).

The menu or list in the screen 156 that can be selected by the user may be chosen by the app 130 based on the present device location (as shown in memory 160) as may be determined from data from the GPS sensor 144 (e.g., what live events are known to the device's app 130 (via lookup to memory 160 and/or by communications over a wireless communications network (not shown in FIG. 1) to an image capture server providing live event schedules for all or subset of possible geographical locations of the device 110) that may be occurring nearby to the present device location 170 within a predefined time period relative to the present time 174 (such as within the next 30 minutes or next 60 minutes)?). In other cases, the module or app 130 may choose the targeted item selection 162 for the user based on the present location 170 of the device 110 in combination with the present time 174 (e.g., when there is only one live event/show at the venue where the device 110 is located, the module 130 may "assume" that this is the event to be recorded with the camera 114).

The module or app 130 may then determine the location (e.g., geographical or 3D coordinates) of the targeted item and store this in memory 160 as shown at 164. The module or app 130 may retrieve this location from memory 160 or from an online source using the targeted item selected (item ID) 162, and this location information 164 may include a FOV where the device 110 and its camera 114 can be located for obtaining a good image 180. This information 164 can then be used by the module/app 130 to provide feedback to the user of device 110 with feedback mechanism 140 to properly orient the lens 116, e.g., based on the device's present location 170 and the FOV/location for the targeted item 164 the user may be able to simply change the pitch or azimuth of the camera 114 or lens 116 or may actually need to move to a new location 170 to be in the FOV (e.g., an audio output may instruct the user via feedback mechanism 140 to move "X feet" in a particular direction).

The image capture module 130 may also act to present an image capture input screen 156 that requests the user to input or select from a set of choices defining start and end times for capturing the image 180. As shown, a start and end time 166 is retrieved by the module 130 for the selected target item 162 (e.g., when does a parade or other live event start and how long is it scheduled to last?), and the screen 156 may be generated or modified to ask the user to define when in this time period a still photograph should be taken (e.g., now or some preset time from the start time or when a particular segment in the show is occurring) or a start time and duration for a video (e.g., start video when character is singing a song on stage and end when song is done, start video at start time of show and continue video for all or a portion of the show, take video at times coinciding with segment of show, start video immediately and continue for next "X minutes," and so on).

The client device 110 includes a number of devices or components that allow the image capture module or app 130 to achieve eyes-free image capture. First, the device 110 may include one or more feedback mechanisms 140 that can be selectively operated by the module or app 130 to guide or instruct a user/operator of the device 110 to change the orientation or position of the device 110 to better orient the camera 114 and its lens 116 to have a field of view (FOV) that is desirable for capturing the still or video digital image 180. For example, the device may have a rumble or vibration mechanism that can be used to let the user know when the device 110 is or, more typically, is not in the proper orientation (e.g., vibrate the housing of the device 110 when the orientation of the lens 116 has moved outside an acceptable lens-orientation range (e.g., acceptable angle range relative to horizontal (or pitch range), acceptable azimuth or rotation angle relative to a vertical rotation angle, and the like). As another example, a digital voice may provide verbal or audio guidance to achieve proper lens orientation (e.g., "please tilt your camera further upward", "rotate your camera further to the left (or right)", and so on). In other cases, a flashing green light may be used to indicate proper lens orientation and a flashing red light may indicate that the camera 114/lens 116 or device 110 should be reoriented to better aim the lens 116 at the targeted item.

To assist the module 130 in capturing images, the device 110 includes a clock 142 providing the present time 174, which can be used by the module 130 in determining when to initiate image capture with camera 114 and when to stop image capture (with duration being user selectable in some cases). The device 110 also includes a mechanism 144 that provides data for determining the present device location 170, which as discussed above may be used by the module 130 to provide location-specific choices for target items/live events in input screens 156, for selecting the item 162, and/or for instructing the user to move the device 110 to a new location to capture the image 180 of the selected target item 162.

The location of the device 110 may be determined in a number of ways and each may be used to implement the element 144. For example, a GPS sensor may be used for location determination mechanism 144 (collecting real-time latitude, longitude, and altitude) while other implementations of the device 110 may use WiFi triangulation, optical marker-based location techniques, or Bluetooth-based wireless techniques to implement the mechanism 144. The device location 170 may also include information as to the height of the device 110 (or its lens 116), and the device 144 may provide data on height and/or another mechanism may be included in device 110 to allow the module 130 to determine device (or camera lens 116) height such as via infrared (IR) or optical signals transmitted from the device 110 and received after reflection from one or more nearby surfaces or through use of the altitude from the GPS sensor 144.

The device 110 further includes one or more components collecting data or information pertinent to the device 110 that allow the module 130 to determine the orientation of the camera 114 and/or its lens 116. For example, the device 110 may include a compass 146 that collects information that the module 130 (or compass-associated software) may use to determine the device azimuth 178 (e.g., an angular measurement of an offset from a reference vector (that typically points north) as measured between the reference vector and an orthogonal vector from a surface of the device 110 (e.g., from its screen 152) or lens 116). Also, the device 110 may include an accelerometer or accelerometry mechanisms 148 that operate to collect data that can be used, by the module 130 or other components in device 110, to determine the device pitch 176 (e.g., the angle from horizontal as may be measured between horizontal and an orthogonal axis of a front plane/surface of the device 110 or, more lens 116). In other cases, a gyroscope may be used in place of or in addition to the compass 146 and accelerometer 148 to provide information to the module 130 to determine the camera lens orientation 172.

Figure 2:
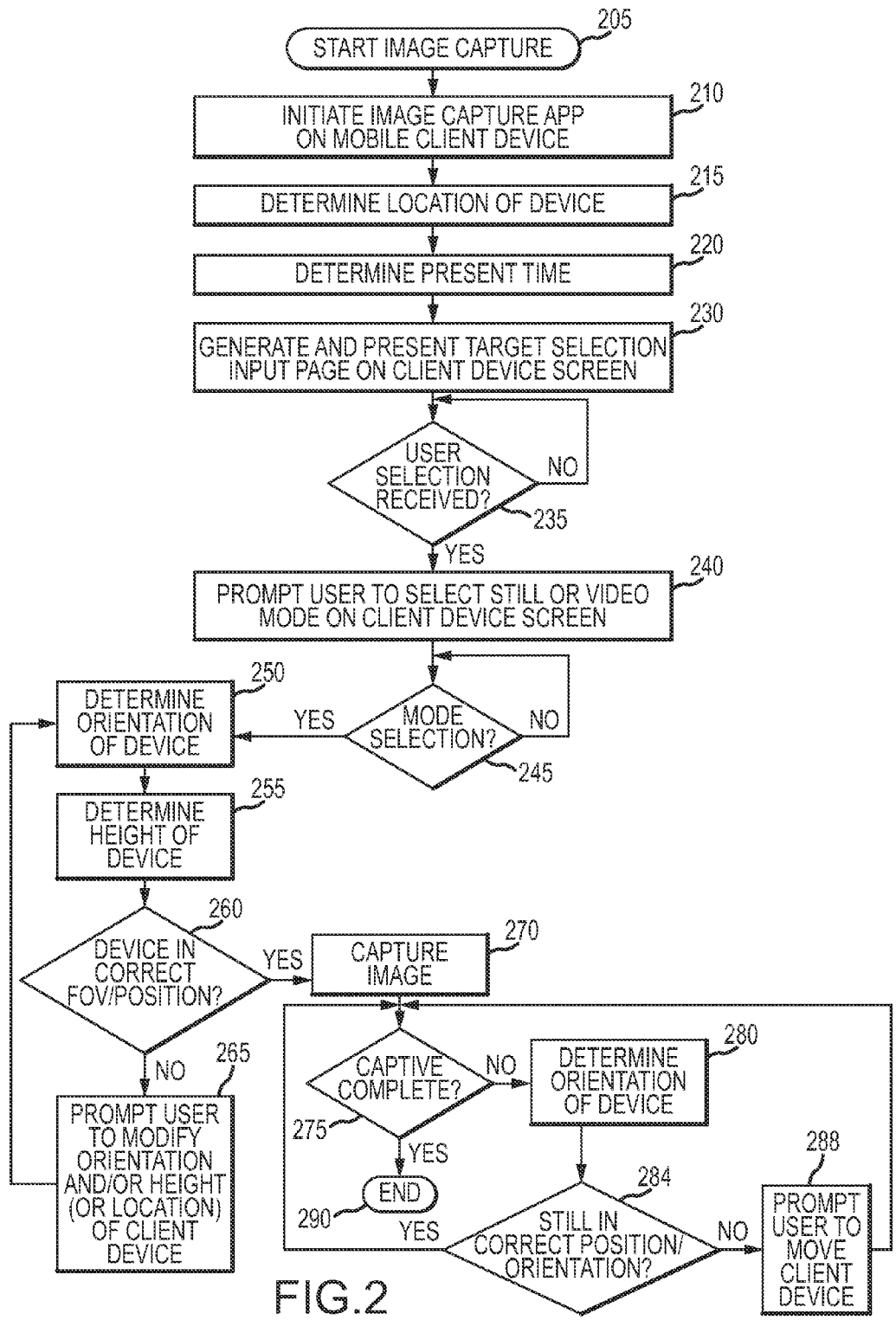
FIG. 2 is a flow diagram of an image capture method (or algorithm) carried out by or via a client device with image capture software or a mobile app that causes the device's processor to act as a special purpose computer/device.

FIG. 2 illustrates an image capture method (or algorithm) 200 that may be carried out by or via a client device as described herein such as device 110 of FIG. 1 with its image capture module or mobile app 130. The method 200 starts at 205 such as with a server being provided on a digital communication network (e.g., the Internet as accessible in a wireless manner via a WiFi link and WiFi components on a client device), and the server may be adapted to serve a mobile app in the form of an image capture module that can be downloaded onto a user's client device (e.g., onto a smartphone, tablet, or the like). For example, the operator of an entertainment facility may provide a mobile app to assist visitors of the entertainment facility in easily and effectively recording all or select portions of one or more of their live events or shows. Since the facility operator is providing the entertainment, they will know beforehand the location of the performance of the live event/show and the schedule for its performance. Further, the provider of the entertainment/live event can determine beforehand what are the useful sets of locations for filming or recording the live event and from each of these locations what are useful FOVs (e.g., from the location "X" in our facility, a user should orient their camera in a predefined manner "Y"). This information can be used by the mobile app to help the user both select a target element for image capture and to properly position/locate and orient their digital camera in their client device to best/better record digital images. Step 205 may further include the user operating their client device (while offsite or at the live event facility or venue) to access the server and to download the image capture module or app onto their client device.

The method 200 continues at 210 with a user operating their client device to initiate the image capture app such as by selecting an app icon on a touchscreen. In response to being initiated, the method 200 may continue with the image capture app being run by the device's processor and its OS. At 215, the image capture app acts to determine the present location of the client device (e.g., with GPS data, with WiFi triangulation, with optical markers, with Bluetooth technologies, or other location-finding mechanisms on the client device). The location of the device may then be stored in device memory for later use (in step 230), and the location may be X-Y coordinates, latitude and longitude values, and so on useful for identifying a specific location within a live event facility or venue or other physical setting (e.g., on a street within a city, in a national park, and so on). At 220, the image capture app acts to determine the present time such as by accessing a device clock or memory storing the current time.

The method 200 continues at 230 with the image capture module or app acting to generate and present a target selection input page on the client device's display screen. As part of step 230, the module or app may use the determined location to look up what live events/shows or other possible target items (e.g., national monuments, picturesque natural objects, historic buildings, and so on) are proximate to the device (and its user). For example, the user may have carried their device into an amusement park and be presently located in a seat in a theater amphitheater, and the module or app may determine based on the current time that a live show is scheduled to start in the next few minutes or is presently being provided to an audience. In another case, the user may have carried their client device into a football stadium, and the module or app may determine that the game is about to start and that the halftime show is scheduled to start at a preset time in the future. In some cases, step 230 (and step 235) is replaced with the module or app simply selecting the target such as when only one live event is being presented near the current device location.

In step 230, the prompt page may simply request confirmation of the one live event/target identified by the module or app as associated with the determined device location while in other cases the page may include two or more possible events/targets for the user to choose from that are associated with the present device location (e.g., a show may be presently live but another show or possible target may be starting within a predefined time period near the present location (such as within the next 1 hour or the like)). At step 235, the image capture module monitors the client devices I/O (such as a touchscreen) for input indicating a selection of a target item for image capture such as a live show or fireworks/light display that is scheduled to start in 10 minutes or a parade that has already started and is passing nearby the client device present location. If no input is received, the step 235 is repeated.

Once a target is selected for image capture at 235, the method 200 continues at 240 with the image capture module acting to update the input page or display screen to prompt the user to select a still or video image capture mode. At 245, the method 200 involves the module or app monitoring the I/O (e.g., touchscreen or keypad) for a choice of still or video image capture, and, often, the method 200 may also involve the user selecting a start time and a stop time (or duration) in the case of video mode. Other embodiments may involve the module or app selecting these values based on the selection of the target item such as selection of a song sung by a character in a show (song starts at "X" and lasts "Y" minutes sets start and stop) or selection of a portion of a parade with a particular character (who is scheduled to pass by the present device location from time X to time Y which sets the start and stop times for image capture). Step 245 is repeated until user selects still or video image capture.

Once the capture mode is chosen, the method continues at 250 with the module or app determining the present orientation of the client device (or its camera lens). As discussed above, this may involve determining the device's azimuth and pitch with a compass and an accelerometer provided in the client device or orientation may be determined in other ways known to those skilled in the arts. At 255, the method 200 continues with the module or app determining the height of the client device (or its camera lens).

At 260, the method 200 continues with the image capture module or app using the device's current location and data on the targeted item (such as a proper FOV for a live event for the current location) to determine an acceptable range of client device locations, orientations, and heights to properly record an image of the user-selected or targeted item. This may involve answering the questions: (1) is the client device in an acceptable location to capture a quality image of the targeted element? and (2) if "yes," is the client device at a proper height and orientation to have a useful FOV for image capture of the targeted item?

If the answer is "no" to either of these questions, the method 200 may continue at 265 with the image capture module or app acting to operate feedback mechanisms of the client device to prompt the user to modify at least one of the device location, device height, and device orientation. For example, the user's location may be near an event venue but be too far away to capture quality images, and the client device may be operated to instruct the user to move closer to the event venue (e.g., move within "X" feet of a stage presented by text or audio output or the like). In some cases, an acceptable range is device dependent with some digital cameras and/or lenses being designed for larger ranges. In other cases, the module or app may recognize that the client device is close enough (or within an acceptable range) but the device location may cause the user's view and their client camera to have one or more sight-blocking structures between their location and the live event or targeted item. In such a case, the module or app may urge the user (such as with text or other visual output, vibration, audio, or other feedback devices) to change their location to better avoid the blocking structures.

In another example of step 265, the user may be holding their device too low to provide a good sight line to the targeted item from the present location, and the prompting may be to raise their device to a greater height (such as with vibration, with audio output from speakers, through visual feedback colors, text, flashing lights/arrows, and so on). In other cases, the orientation may not provide a good FOV for the targeted item from the present location and the feedback may be provided to encourage the user to reorient their device and its built in camera (camera lens) such as to change the pitch and/or azimuth with rumble/vibration feedback, with audio feedback, with visual feedback, and the like. The visual feedback provided at 265 may be to cause the entire screen to go green (or another color) when the camera is properly oriented and to go still or flashing red (or another color) when the camera's orientation (or height or location) is not desirable (e.g., not providing an acceptable FOV for the targeted item from the present device location).

When the device is in correct position/orientation to get a "good" FOV at 260, the method 200 continues at 270 with the image capture module operating the camera to record a still or video image (based on the selected mode) of the targeted item. In some cases, though, image capture at 270 will start whenever the start time is reached rather than waiting for proper orientation/positioning of the client device to avoid missing a portion of a live event. Then, the method 200 continues at 275 with a determination of whether or not image capture is complete. The answer will be "yes" if the mode is "still" and the method 200 will then end at 290 with the captured image being stored in device memory.

If in video mode, the answer at step 275 will be based on a determination of whether or not a capture duration has elapsed. If not complete, the method 200 continues at 280 with a determination of the present orientation (and, optionally, height and/or location) of the client device. Then, at 284, the method 200 includes determining whether the camera or client device is in the proper orientation. If "yes," the method 200 continues at 275. If "no," the method 200 continues at 288 with the image capture module or app acting to again prompt the user via feedback mechanisms to move the client device (e.g., adjust the pitch or azimuth to have the line of sight of the camera or its lens fall within the acceptable FOV for the present location and the selected target item for the image capture process 200).

FIGS. 3-6 illustrate a client device 320 that is configured according to the present description with image capture software (or a mobile app) as it is being used by an operator or user 305 to capture or record a digital image of a user-selected target (or targeted item) in a guided but eyes-free manner. In FIG. 3, a user 305 has carried their client device 320 into a space 300 such as an entertainment facility or venue, an outdoor space with natural objects of beauty, or any other locale or space where it may be desirable to capture images using the methods taught herein. In this example, a set or stage 310 is provided nearby to the present location of the client device 320. The set or stage 310 may be any structural or bounded subset of the target item space 300 upon which a live event or other targeted item may be located. In this example, the stage 310 has an upper surface 312 upon which a number of performers (e.g., actors, dancers, singers, and so on) 315 are located during a live event (e.g., a show). A front edge or end 314 of the stage 310 may be used to determine a distance, d, from a front face 322 of the client device 320 and the stage 310 when the user-selected target item is a show involving the performers 315 on the surface 312 of the stage 310 (but other portions of the set/stage 310 may be used to achieve a desired image capture).

Figure 5:
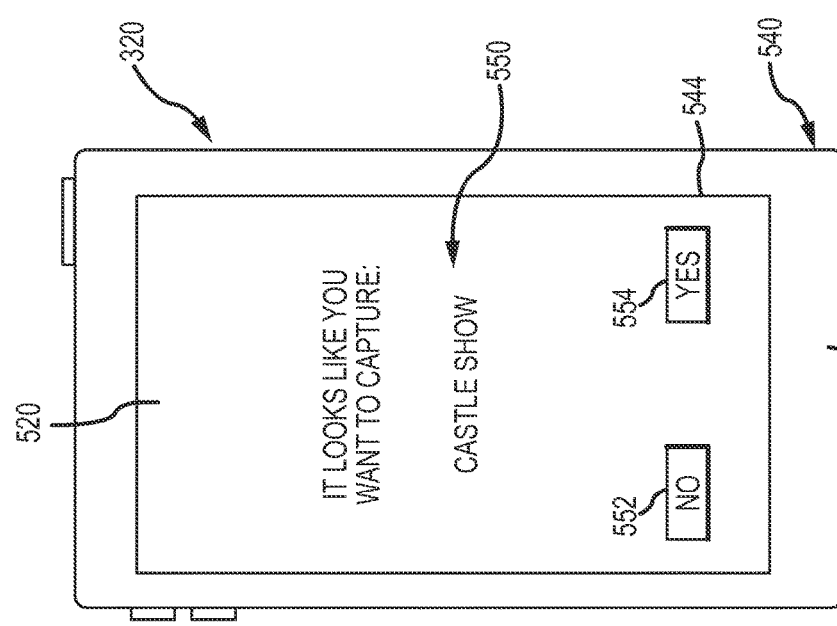

During use of the device or during motion capture processes involving the device 320, the device 320 or its image capture software may act to determine the present location (e.g., geographic coordinates) of the device 320 in the space 300. With this present location known, the image capture software can function to look up possible target items for the device 320 at the present time (or within a predefined time period about the present time such as up to about 1 hour before or after the present time). As shown in FIG. 5, the client device 320 includes a body 540 with a display screen 544 on a face (or front surface) 322. The image capture software may act to generate an image capture page 520 that is displayed in the screen 544, and this page 520 may provide text or imagery prompting the user of the device 320 to select a target item for filming/image capture. In this example, the client device 320 was determined to have a location that is associated with presenting a live event (i.e., a "Castle Show") on the stage 310 in space 300. This determination may involve a determination that the distance, d, is within a preset image capture range (e.g., within a typical digital capture range (e.g., 50 to 300 feet or the more depending on the live event/target event and values selected for average distances for which digital cameras are useful in capturing images) for recording a still or video image of a show on the stage 310).

As shown in FIG. 5, the screen 544 is operated to display text indicating that the user has initiated the image capture app and the app has determined that the user can choose to capture a particular target item (i.e., "It looks like you want to capture: Castle Show"). Only one target item is shown in this example, but the image capture module may list two or more possible targets in some cases. The screen 544 has also been used to display selection buttons 552, 554 asking the user 305 to provide input confirming or selecting the targeted item for image capture by the client device 320.

Figure 6:
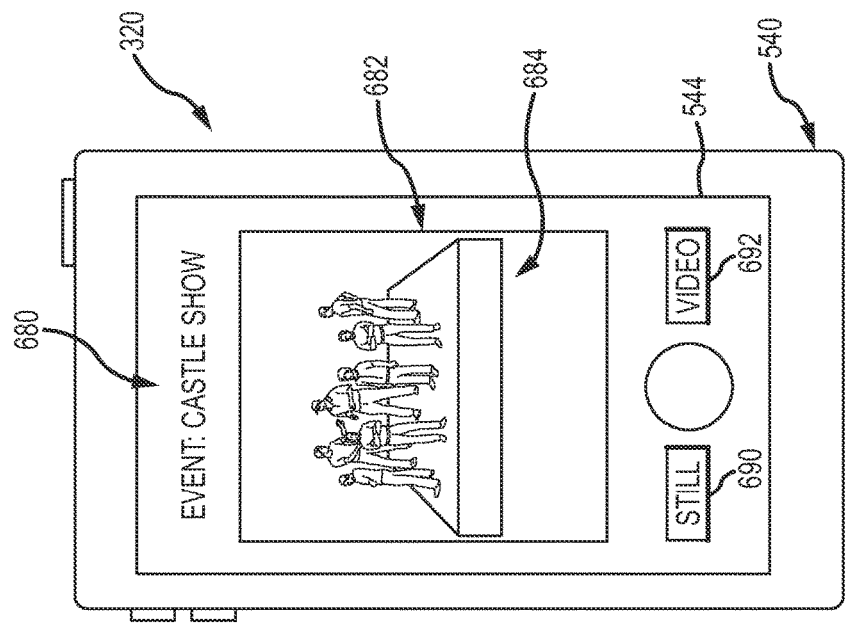

In FIG. 6, the device 320 is shown after the user 305 has confirmed/selected a particular target item as shown by text/images 680 in the screen 544. Further, the screen 544 is updated to include a window 682 indicating the present view of the targeted item 684 (e.g., the present state of the stage 310 as viewed through the lens of the camera of the client device 320). The image capture software has also updated the page/display on screen 544 to prompt the user 305 for input with buttons 690, 692 as to whether the image capture should be performed in still or video mode. A start time and/or end time (or duration) may also be requested in the screen 544 as part of the function/step shown in FIG. 6.

In response to receiving the still or video selection input in FIG. 6, the image capture module of device 320 may act to determine an orientation of the client device 320 such as its face 322 relative to the targeted item (e.g., a show/live event on stage 310). Note, the user input may also indicate whether the front or rear camera (or front or rear lens) is being used by the operator to capture the image, and the orientation would be determined for the proper face of the device. For example, the azimuth of the face 322 may be found by the image capture app, and this information may be used to determine whether the device's FOV (or viewing angle) as shown in FIG. 3 is desirable to capture a quality image of the targeted item (e.g., the performers 315 on surface 312 of stage 310). For example, a FOV for the stage 310 or its front edge 314 may be determined for the present location of the device 320, and it may be determined whether or not a ray that is orthogonal to the face 322 of the device 320 falls within this FOV or more preferably bisects the FOV (is at or near the center of the FOV). If the orientation is not desirable, the image capture app may operate feedback mechanisms in the device (e.g., the rumble, audio devices, or visual/lighting components) to urge or guide the user 305 to rotate the device 320 to better orient the face 322 (or the camera lens) relative to the targeted item in space 300. Once properly oriented (or while orientating is being performed), the image capture module may operate the camera of the device 320 to capture the targeted item (here "the Castle Show") in the selected capture mode (e.g., a still shot or a video clip).

The orientation and/or positioning determination may also include, as shown in FIG. 4, the image capture software causing the device 320 to determine the present height, h, of the client device 320. If this is not acceptable for capturing images at the device's present location (such as due to structure blocking the lens of the camera from seeing all of the stage 312 or the performers 315), the image capture software may cause the feedback mechanisms of the device 320 to be operated to prompt the user 305 to raise (or even lower in some cases) the device 320 to alter the height, h, to be within an acceptable height range at the present device location and for the selected target item in space 300.

Further, the image capture module may cause the device 320 to function to determine the present pitch, $\theta_{pitch}$, of the client device 320, which may be measured as the angle between horizontal 470 and a ray 472 extending orthogonally from the device face 322 (e.g., from a camera lens front surface (not shown)). If the pitch is not within an acceptable pitch range for the selected target item and the device's present location, the image capture software may activate feedback mechanisms to urge the user 305 to tip the face 322 upward or downward (rotate the device 310 about a horizontal axis) to move the device 310 (or its camera lens) into a proper pitch to better capture/record images of the targeted item in the space 300 from the present device location.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, the image capture module or app is further configured to enable the user of the client device to augment the captured image. For example, after image capture is completed as described above, the module or app may act to prompt the user to select image augmentation. When selected, the module or app may act to determine what types of augmentation are available for the particular captured image (e.g., by accessing a web server storing augmentation layers/images for each of a number of possible target items (e.g., live events put on by an entertainment facility operator or the like)). For example, the targeted item may be a live show presented at a particular venue, and the augmentation may be "layers" from a set associated with the live show. These layers may be images of actual set pieces present at or used during the performance but in better quality or these may be images of real or animated set pieces or other augment elements created for the targeted item (live show in this example). The user may select which augmentation layers to apply, and these layers are combined with or applied to the captured digital image to create an augmented digital image.

In some cases, the user may also be able to personalize one or more of these augmentation elements, e.g., select colors, select characters to include, enter data such as their name, time of image capture, and descriptive text (e.g., "Lightshow from New Year's Eve 2016," "Parade at Our Favorite Amusement Park During Jenny's 10$^{th}$ Birthday," and so on). Note, proper augmentation may require information stored for the client device during the image capture such as device location, distance, orientation, and height as the augmentation layers are selected or adjusted to match this device information to enhance the quality of the augmentation product (e.g., added set elements are digitized to appear as if they were captured by the client device with its location, height, and orientation).

In the same or other embodiments, the image capture module may be adapted to assist the user to capture a particular target item that moves during the image capture time period or duration. For example, a user may select to capture a live event that includes a plurality of performers. The image capture module may be configured to determine the list of performers (e.g., characters from a movie, athletes on a team(s), singers/dancers, and so on) in the live event and present a subset that can be tracked for better or specific image capture during the image capture period (duration of a video). The user may select one of these performers, and the image capture module may then act to determine the location of the selected performer or particular target item within the live event throughout the image capture period. This information is then used to provide feedback to the user via the client device's feedback mechanisms to urge or assist them in moving their client device to follow the particular target item even as the target moves relative to the user, and this moving of the client device may involve simply altering the azimuth (rotating the device's face or camera lens about a vertical rotation axis) or may also involve changing the device's pitch (such as when the performer moves up or down stage or changes their height relative to the user's client device).

In the same or yet a further embodiment, the image capture module or app may be configured to activate or operate feedback mechanisms in the client device that cause the client device to move toward the desired or acceptable orientation for the particular client device location and the targeted item for image capture. For example, the image capture module may function to determine that the client device needs to have a pitch that differs from the present pitch, and the module may act to force the device to move in the user's hands to have a pitch within the acceptable pitch range (a similar process can be followed to adjust the azimuth). Hence, the body of the client device may be moved by the image capture module or app via onboard movement mechanisms to focus the camera toward the targeted item in an automated manner or to keep the device's camera in focus if the user should move after focus is achieved during the image capture period.

Several means are available to implement the systems (such as device 110 of FIG. 1) and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

I claim:

1. A client device adapted for enhanced image capture, comprising:
 a processor;
 memory accessible by the processor;
 a camera with a lens, the camera capturing a digital image via the lens and storing the captured digital image in the memory;
 a body containing the processor, the memory, and the camera; and
 an image capture application run by the processor to select a target item to be included in the captured digital image, wherein the image capture application causes the processor to operate one or more feedback mechanisms to prompt an operator of the client device to move the body to move the lens of the camera, before or during the capturing of the digital image, from a first orientation to a second orientation relative to the target item,
 wherein the image capture application determines the first orientation and the second orientation using orientation sensing components in the client device,
 wherein the first orientation comprises a first pitch and a first azimuth and the second orientation comprises a second pitch and a second azimuth,
 wherein the image capture application further acts to determine a present location of the client device,
 wherein, when the second orientation is within a range of acceptable orientations for capturing an image of the target item from the present location, the image capture application automatically initiates the capturing of the digital image, and
 wherein the image capture application further acts to determine a first height of the lens of the camera, to compare the first height of the camera to an acceptable range of heights for capturing the image of the target item at the present location of the client device, and when the first height is outside of the acceptable range of heights to operate the one or more feedback mechanisms to prompt the operator to move the camera from the first height to a second height within the acceptable range of heights.

2. The client device of claim 1, wherein the second orientation is selected to provide the camera with a field of view of the target item from the present location.

3. The client device of claim 1, wherein the feedback mechanisms include a vibration mechanism selectively operable until the lens of the camera is in the second orientation.

4. The client device of claim 1, wherein the feedback mechanisms include a mechanism adapted to move the body of the client device within a hand of the operator to automatically move the lens of the camera from the first orientation to the second orientation.

5. The client device of claim 1, wherein the feedback mechanisms include a mechanism prompting the operator to move the client device by providing audio cues.

6. The client device of claim 1, wherein the target item is selected by the image capture application based on a determination of the present location of the client device.

7. The client device of claim 1, wherein the image capture application acts to lookup a set of potential targets local to the present location, and to display the set of potential targets on a display screen of the client device to prompt the operator to indicate the target item from the set of potential targets.

8. A client device adapted for enhanced image capture, comprising:
   a processor;
   memory accessible by the processor;
   a camera with a lens, the camera capturing a digital image via the lens and storing the captured digital image in the memory;
   a body containing the processor, the memory, and the camera; and
   an image capture application run by the processor to select a target item to be included in the captured digital image, wherein the image capture application causes the processor to operate one or more feedback mechanisms to prompt an operator of the client device to move the body to move the lens of the camera, before or during the capturing of the digital image, from a first orientation to a second orientation relative to the target item,
   wherein the image capture application responds to user input to retrieve from the memory and to augment, and then store in the memory, the captured digital image previously captured during the capturing by the camera using augmentation layers selected or modified based on at least one of an orientation of the lens of the camera relative to the target item, a distance between the lens of the camera and the target item, and a height of the lens of the camera during the capturing of the digital image.

9. A device for recording digital images, comprising:
   a digital camera;
   a location sensor sensing a present location of the device;
   a display screen;
   and an image capture module retrieving a set of potential targets for imaging from the present location, generating a prompt page displayed on the display screen, receiving user input, via the prompt page on the display screen, selecting one of the potential targets for use as a target item, determining a range of orientations for the digital camera for use during image capture for the target item and for the present location, prompting a user to move the digital camera into an orientation within the range of orientations, and automatically initiating operation of the digital camera to capture a digital image of the target item without additional user input,
   wherein the receiving of the user input is performed prior to focusing of the digital camera on the target item, and
   wherein the image capture module responds to additional user input to retrieve from the memory and to augment, and then store in the memory, the captured digital image previously captured during the capturing by the digital camera using augmentation layers selected or modified based on at least one of an orientation of lens of the digital camera relative to the target item, a distance between the lens of the digital camera and the target item, and a height of the lens of the digital camera during the capturing of the digital image.

10. The device of claim 9, wherein the prompting of the user to move the digital camera comprises providing tactile or audio cues to the user via feedback mechanisms of the device.

11. The device of claim 9, wherein the prompting of the user is performed before and during the operation of the digital camera to capture the digital image, whereby focus assist is provided during image capturing with the digital camera.

12. The device of claim 9, wherein the image capture module further acts to augment the captured digital images with one or more augmentation layers selected or modified to match the present location of the device and the orientation of the digital camera during the image capture.

13. An image capture method, comprising:
   determining a location of a digital camera;
   based on the location, selecting a target for image capture;
   determining a first orientation of the digital camera; and
   based on the target for image capture, providing feedback to move the digital camera from the first orientation to a second orientation within a range of orientations for image capture of the target from the location,
   wherein the providing feedback is performed during operations of the digital camera to capture of a video image of the target and the providing feedback comprises providing tactile or audio cues to the user via feedback mechanisms of the digital camera, and
   wherein the method further comprises responding to user input to retrieve from memory and to augment and then store in the memory, the video image previously captured using augmentation layers selected or modified based on at least one of an orientation of a lens of the digital camera relative to the target, a distance between the lens of the digital camera and the target, and a height of the lens of the digital camera during the operations of the digital image to capture the video image of the target.

14. The method of claim 13, wherein the target for image capture comprises a portion of a venue for a live event and wherein the method further comprises providing feedback to move the digital camera from the second orientation to a third orientation to track movement of a user-selected element of the live event during an image capture process for the target.

15. The method of claim 13, further comprising determining a first height of the digital camera at the location and based on the location and the target for image capture providing feedback to move the digital camera from the first height to a second height within a range of heights for image capture of the target from the location.

16. The method of claim 13, wherein the first orientation comprises a pitch of the lens of the digital camera and an azimuth of the lens of the digital camera.

* * * * *